(12) United States Patent
Taylor

(10) Patent No.: US 10,722,067 B2
(45) Date of Patent: Jul. 28, 2020

(54) FILTRATION SYSTEM

(71) Applicant: COSTA EXPRESS LIMITED, High Wycombe (GB)

(72) Inventor: Nathan Taylor, Goring (GB)

(73) Assignee: COSTA EXPRESS LIMITED, Buckinghamshire (GB)

( * ) Notice: Subject to any disclaimer, the term of this patent is extended or adjusted under 35 U.S.C. 154(b) by 0 days.

(21) Appl. No.: 16/347,789

(22) PCT Filed: Nov. 7, 2017

(86) PCT No.: PCT/GB2017/053335
§ 371 (c)(1),
(2) Date: May 6, 2019

(87) PCT Pub. No.: WO2018/083498
PCT Pub. Date: May 11, 2018

(65) Prior Publication Data
US 2019/0357722 A1 Nov. 28, 2019

(30) Foreign Application Priority Data

Nov. 7, 2016 (GB) .................................. 1618761.9

(51) Int. Cl.
A47J 31/60 (2006.01)
A47J 31/42 (2006.01)
(Continued)

(52) U.S. Cl.
CPC ............. *A47J 31/605* (2013.01); *A47J 31/42* (2013.01); *A47J 31/4489* (2013.01);
(Continued)

(58) Field of Classification Search
CPC ........... A47J 31/545; A47J 31/58; A47J 31/54
(Continued)

(56) References Cited

U.S. PATENT DOCUMENTS 5,039,402 A * 8/1991 Himelstein ........... A47J 31/605
210/121
2008/0181985 A1* 7/2008 Caswell .............. A47J 31/4485
426/42
(Continued)

FOREIGN PATENT DOCUMENTS

CN 202151531 2/2012
CN 203307165 11/2013
(Continued)

OTHER PUBLICATIONS

International Searching Authority, "Search Report" in application No. PCT/GB2017/053335, dated Feb. 13, 2018, 12 pages.

*Primary Examiner* — Thien S Tran
(74) *Attorney, Agent, or Firm* — Hickman Palermo Becker Bingham LLP; Christine E. Orich

(57) ABSTRACT

A filtration system for use in a beverage dispensing machine comprising a first and second boiler is described. The filtration system comprises:

an input fluid line for connecting the system to a water source;

a first filter module connected to the input fluid line;

an output fluid conduit connected to the first filter and configured to have a first fluid output line for directing fluid to the first boiler and a second fluid output line for directing fluid to the second boiler; and a second filter module, located in the in the second fluid output line;

wherein the second filter module is capable of removing ions not removeable by the first filter module.

16 Claims, 3 Drawing Sheets

(51) Int. Cl.
  *A47J 31/44* (2006.01)
  *A47J 31/54* (2006.01)
  *C02F 1/28* (2006.01)
  *C02F 1/42* (2006.01)
  *C02F 101/10* (2006.01)

(52) U.S. Cl.
  CPC ............. *A47J 31/542* (2013.01); *C02F 1/283* (2013.01); *C02F 1/42* (2013.01); *C02F 2001/422* (2013.01); *C02F 2101/10* (2013.01); *C02F 2301/043* (2013.01); *C02F 2307/10* (2013.01); *C02F 2307/12* (2013.01)

(58) Field of Classification Search
  USPC .......... 99/279, 280, 289 R, 290; 426/42, 433
  See application file for complete search history.

(56) References Cited

U.S. PATENT DOCUMENTS

| | | | | |
|---|---|---|---|---|
| 2017/0007946 A1* | 1/2017 | Nuss | ........................ | C02F 1/001 |
| 2018/0296026 A1* | 10/2018 | Tseng | ........................ | A47J 31/54 |
| 2019/0119137 A1* | 4/2019 | Floren | ........................ | C02F 9/00 |

FOREIGN PATENT DOCUMENTS

| | | | | |
|---|---|---|---|---|
| CN | 105800809 A | 7/2016 | | |
| DE | 40 15 336 A1 | 11/1991 | | |
| EP | 2272410 A1 | 1/2011 | | |
| WO | WO2006/079500 A1 | 8/2006 | | |
| WO | WO-2017042307 A1 * | 3/2017 | ................ | C02F 9/00 |

\* cited by examiner

FILTRATION SYSTEM

TECHNICAL FIELD

This invention relates to a filtration system for a beverage dispensing machine.

BACKGROUND

Two main systems are used in existing automated bean to cup coffee dispensing machines for the production of hot water and steam. In the first type the hot water and the steam are created in a single boiler. In the second type the beverage machines comprise two boilers which have different functions. One boiler (water boiler) is used to create the hot water required to brew the coffee (or to dispense hot water into the cup) the other boiler (steam boiler) is used to create the steam required to heat the milk and produce milk foam.

In the two boiler systems, coffee machines tend to operate with a single filtered water supply, with the filtered water split between the steam and water boilers, as required. There are four main types of cartridge filters that can be used in these machines:
- activated carbon only (used for soft or pre-treated water to provide filtration of particulates, organics and, for example, chlorides);
- activated carbon plus mineral addition (used for soft or pre-treated water only where the user also wishes to increase the mineral content for reasons of taste profile in the drink or conductivity);
- activated carbon plus hydrogen anion exchange (for harder water where the user also wishes to reduce the build-up of limescale through the removal of carbonate ions); and
- activated carbon plus sodium cation exchange (for hard or gypsum waters where the user wishes to reduce the build-up of limescale or gypsum through replacement of calcium and magnesium ions with sodium ions that do not precipitate out as limescale/gypsum in the tanks).

The per litre cost of filtration is strongly dependent upon the type of filtration used. Carbon only filters have a low cost per litre (currently around 0.16 pence per litre), hydrogen filters have a medium cost per litre (currently around 1.5p per litre), sodium filters have a high cost per litre (currently around 2.5 p per litre). Carbon filters with mineral addition also have high cost per litre. A typical bean to cup coffee machine will use about 20 litres of water per day (based on a 50 cup per day usage rate).

The chemical composition of the water entering the coffee making modules of a beverage dispensing machine is determined by the composition of the incoming water to the filter and the effect of the filter in modifying the composition before it enters the coffee making modules. However the preferred water composition required by the different water systems within the coffee machine varies. Therefore the use of a single filter water system can led to a compromise between the requirements of the water used for making the coffee and the water used to make steam for the milk.

The water used for the brewing of coffee requires relatively high mineral content in order to develop the correct tastes and aromas of the coffee. This water is held in liquid form throughout the system and is generally in the temperature range 92° C. to 96° C. As the water used to produce coffee flows in and out of the coffee boiler in the same physical state the concentration of minerals within the boiler is largely in a steady state, controlled by the incoming water and the operation of the filter.

The water used to produce steam for the production of hot milk and hot milk foam requires minimal mineral content, especially regarding the presence of $Ca^{2+}$ and $Mg^{2+}$ cations, and $CO_3^{2-}$ and $SO_4^{2-}$ anions, to prevent the formation of calcium and magnesium carbonates (limescale) and calcium sulphate (gypsum) within the steam tank. The saturation levels of harmful minerals in the tank decreases with increasing temperature, and therefore as the steam boiler runs at around 135° C. the propensity for minerals to deposit is higher in the steam boiler than in the coffee boiler.

In current water systems for beverage dispensing machines the mineral content in the steam boiler increases with cups dispensed between boiler blow-down cycles (when the water in the boiler is changed, normally at a daily clean). This is because the infeed water in the liquid phase contains minerals, whilst the outgoing fluid in the gaseous phase contains little or no minerals. This results in an increase in mineral content over time in the steam boiler as steam is used to heat milk for coffees and automatic machine rinses are performed. Once the mineral content goes above a threshold level in the steam boiler limescale (and gypsum) will form, which inhibits the performance of the steam system causing the system to require a maintenance operation to rectify. Scale build-up in the steam tank can result in failure of the steam temperature probe, failure of the water level probe, reduced effectiveness of the heater element, reduced volume of the tank resulting in a reduced head of steam, reduced flow rate into the tank through the water fill tube, increased energy costs and/or cold or under-filled drinks.

Once the limescale or gypsum has started to form in the steam tank it is not possible to remove it in normal running. If a hydrogen filter has been used replacement of the filter will reduce pH leading to break up of the scale into small particles which may lodge in the steam control valves downstream. Remedial action is normally carried out to either replace the affected parts at a high cost, or to run a descaling process in situ involving the use of aqueous acids to dissolve the limescale in the tank. Removed parts may be descaled chemically away from the installation through a refurbishment route. However repeated descaling may eventually lead to the boiler parts being scrapped due to galvanic corrosion between the dissimilar metals used to fabricate the different parts of the tank assembly.

The current filtration systems used in beverage dispensing machines, particularly in a hard or moderately hard water area can be a compromise between coffee quality, machine reliability and cost. A single sodium filter will give poorer coffee quality but higher machine reliability at a higher filter cost, a single hydrogen filter will give better coffee quality and lower machine reliability at a lower filter cost.

The invention provides an alternative filtration system suitable for use in two boiler beverage dispensing machines.

SUMMARY

According to a first aspect of the invention there is provided a filtration system for use in a beverage dispensing machine comprising a first and second boiler. The filtration system comprises:
- an input fluid line for connecting the system to a water source;
- a first filter module connected to the input fluid line;
- an output fluid conduit connected to the first filter module and configured to have a first fluid output line for directing fluid to a first boiler and a second fluid output line for directing fluid to a second boiler; and a second filter module, located in the second fluid output line;

wherein the second filter module is capable of removing ions not removeable by the first filter module.

The second filter module may remove calcium and/or magnesium ions.

The first filter module may remove carbonate ions.

The first filter module may be configured to bring the hardness of the water to around 4 KH.

The filter modules may comprise an activated carbon filter and/or a mild acid anion exchange filter. The first filter module preferably comprises an activated carbon plus hydrogen anion exchange filter. The second filter module may comprise an sodium cation exchange filter. Preferably the first filter module comprises an activated carbon plus hydrogen anion exchange filter and the second filter module comprises a sodium cation exchange filter.

The first filter module may be a variable bypass filter. The filters may be removeably mounted in the system.

A further aspect of the invention is a beverage dispensing machine comprising a filtration system as described above.

The beverage dispensing may comprise a first boiler for heating water to be dispensed and a second boiler to produce steam to be dispensed, a coffee brewer and a dispensing spout, wherein the filtration system is connected to the first boiler via the first fluid output line and the second boiler by the second fluid output line.

The beverage dispensing machine may further comprise a coffee grinder and a container for holding a milk supply. The beverage machine may comprise additional modules such as a water supply.

BRIEF DESCRIPTION OF THE DRAWINGS

Various embodiments of the invention will now be described, by way of example only, with reference to the following drawings in which.

DETAILED DESCRIPTION

Figure 1:
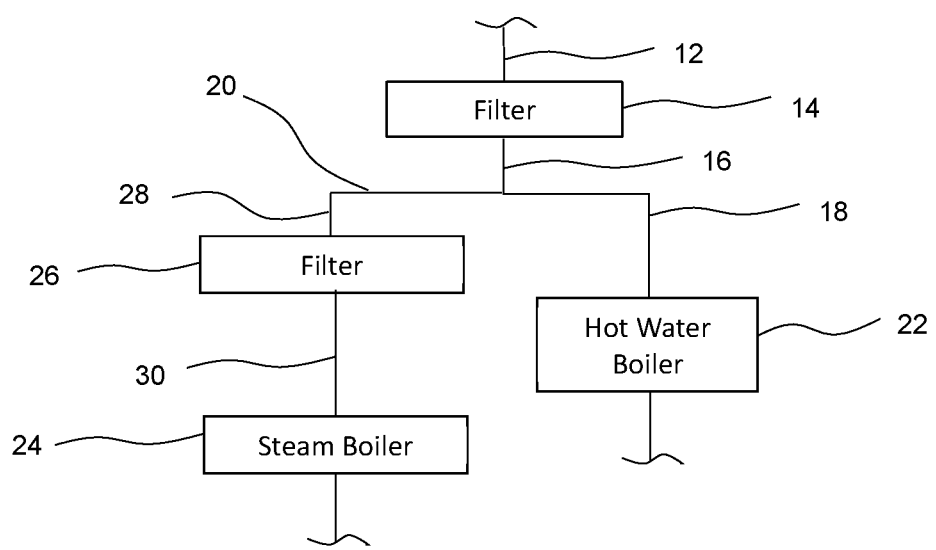
FIG. 1 is a block diagram of a filtration system according to an embodiment of the invention connected to a two boiler system.

The filtration system 10 according to the invention is connected to a two boiler system as shown in FIG. 1. A water inlet fluid line 12 connected to a water source (not shown) is coupled to a first filter module 14 which is connected to a main output fluid conduit 16. The main output fluid conduit 16 is connected to the outlet of the first filter module and splits into a first fluid output line 18 and a second output fluid line 20. A valve (not shown) controls the flow into the first and second output fluid lines at a T-junction of the main output fluid conduit.

The first output line is coupled to the water boiler 22 to provide a flow passage for a water stream directly from the first filter module to the water boiler 22. The second fluid output line 20 is coupled to the steam boiler 24 to provide a flow passage for a water stream from the first filter module to the steam boiler 24 via the second filter module 26. The second fluid output line 20 comprises a filter input section 28 and a filter output section 30. The second filter module 26 is mounted in the flow passage of the second outlet line 20, between the input section 28 and the output section 30. The end of the filter input section 28 is connected to the inlet of the second filter module and one end of the filter output section 30 is connected to the outlet of the second filter module, and the other end of the filter output end connected to the steam boiler.

During operation, water flows from the water source through the water inlet line 12 into the first filter module 14. The first filter module removes components from the water, such as particulates, organic components, and carbonate ions. The first filter module provides a water output stream with a hardness of around 4 KH. The water stream exiting the first filter module 14 is split into two water streams a first stream which is directed into the first output line 18 and a second stream that is directed into a second fluid output line 20. Water directed into the first output line 18 flows directly into the water boiler 22. Water directed into the second output line 20 flows through the second filter module 26 and then into the steam boiler 24. The second filter module removes components such as calcium and magnesium ions from the water.

With a single input of water into the filtration system, water that enters the steam boiler has passed through two different filter modules in series, the primary and secondary filters. Whilst the water that enters the water boiler has only passed through one filter module of the filtration system, the primary filter. This enables the composition of the water entering each of the different modules to be optimised for their function.

The first filter will be of a different type from the second filter module. By different type of filter it means that the second filter module can remove a component from the water not removed by the first filter module. For example the second filter module is configured to remove ions such as calcium and magnesium, while the first filter module is configured not to substantially remove such ions from the water stream.

The filter modules are mounted in their respective flow passages so that they are removeably connected to the fluid lines of the filtration system, such that the filter media can be replaced when required. The filter modules typically comprise a filter head, comprising water inlet and outlet ports, connected to a removable filter cartridge comprising the filter media. The inlet port of the filter module will connect to the input fluid line of the filtration system and the outlet port of the filter module will connect to the output fluid conduit.

The type of primary filter used in the system will depend on the composition of the incoming water. Filters that can be used include activated carbon filters, including activated carbon plus hydrogen anion exchange filters. The primary filter will be a filter that is not configured to remove ions such as calcium and magnesium.

When the incoming water is soft (>3 KH carbonate hardness) either due to the water being sourced from a low carbonate hardness mains supply or where the has been treated through the locations own water treatment system an activated carbon filter with no ion exchange can be used.

When the incoming water is hard water (i.e. between 4-30 KH), but where the temporary hardness is greater than permanent hardness, a mild anion exchange filter, such as an activated carbon plus hydrogen anion exchange filter can be used.

Typical activated carbon filters that can be used include the carbonate ion filters such as those generally available from Brita, BWT and Everpure/Pentair, i.e. those filters in the Brita Purity, Brita Quell, BWT Bestmax and Everpure Claris ranges.

The secondary filter provided in the second outlet line is a filter that removes ion such as calcium and magnesium, such as a sodium cation exchange filter. The sodium cation exchange filter replaces calcium and magnesium in the water with sodium ions. The sodium ions do not precipitate out as limescale or gypsum, preventing limescale and gypsum build-up in the steam boiler. As well as comprising a filter medium for sodium cation exchange, the secondary filter can also contain an activated carbon filter medium. Such filters can be obtained from Brita, for example those in the Brita Purity Finest range.

In one embodiment of the invention the first filter module is a variable by-pass filter. The first filter module includes a variable bypass function which adjusts the degree of filtration of the incoming water depending on a balance between incoming water hardness and propensity for the steam boiler to form scale. The bypass setting is higher on lower hardness water which increases the life of the filter. Filters modules with a fixed by-pass head can also be used. Such by-pass filters are supplied by Brita, BWT and Everpure/Pentair.

When a variable by-pass filter is used, all the water from the input line enters the filter module with a portion of the water stream being filtered by the first filter module. A first portion of the input water stream passes through the filter media to be treated, and the remaining portion of the water stream by-passes the filter media in the filter module and passes through the filter module untreated, such that a treated and untreated stream of water is provided. The treated stream of water and non-treated stream of water combine before exiting the filter module into the main outlet line.

Filtering water for the steam boiler through a second sodium filter allows the first filter to be run with increased bypass because the steam boiler system is more tolerant of higher carbonate concentrations. This can assist in increasing the life of the primary filters.

The filtration system is for use with an automated beverage machine for example the type of vending machine for hot, cool and cold beverages, including coffee, tea, chocolate and other beverages, for example as described in WO2014/075833.

An automated beverage machine for vending coffee includes a body which carries a plurality of modules, including the filtration system, a two boiler water heating system, a brewer for brewing coffee, a dispensing spout, a coffee grinder and a container to hold a supply of milk. The beverage machine may comprise an internal water supply for the source of water to produce the beverage, or the filtration system can be connected to an external water source, for example to mains water. The two boiler system includes a boiler to produce the hot water required to brew the coffee or to be dispensed as hot water into the cup, and a boiler to create steam required to heat milk and form milk foam.

Figure 2:
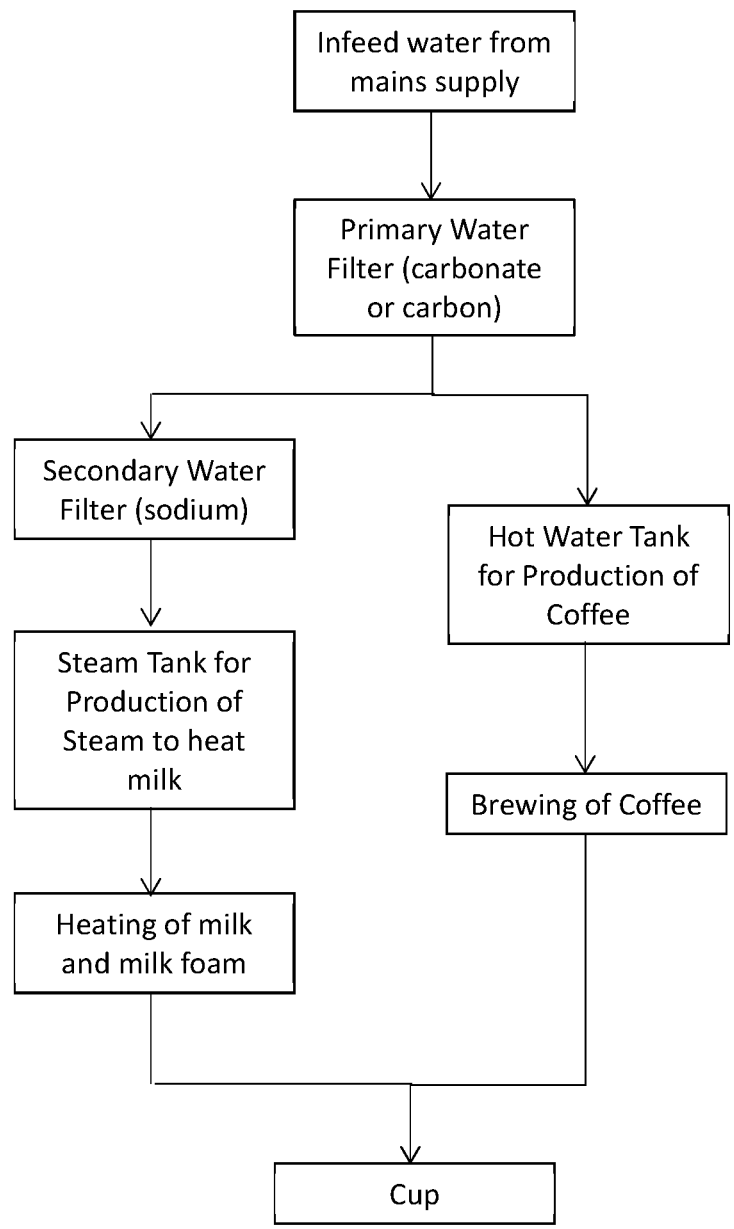
FIG. 2 shows a flow diagram showing steps involved in operating a beverage dispensing machine using the filtration system of the invention.

FIG. 2 shows the basic steps involved in operation of the beverage machine comprising the filtration system for producing a cup of coffee. During operation, cold water flows through the inlet fluid line from the water source and through the first filter module and provides a water stream with a hardness of around 4 KH. The water exits the first filter module and is then directed into both the first fluid output line and second fluid output line towards their respective boilers.

Water directed into the first output line flows directly into the water boiler, where the water is heated for brewing coffee or dispensing as hot water into the cup. In the water boiler the water is generally maintained in the temperature range of 92° C. to 96° C. Water is dispensed from the water boiler to the coffee brewer module, after which it may be mixed with milk and dispensed into a cup via a dispensing spout.

Water directed into the second output line flows through the second filter module, to remove calcium and magnesium ions from the water, before flowing into the steam boiler. The steam boiler will be kept at a temperature of around 125° C.-145° C. Steam is dispensed from the steam boiler via a steam supplying conduit to heat milk and produce milk foam. The milk can then be mixed with the coffee, and dispensed into the cup.

The filtration system of the beverage dispensing machine uses a split filter arrangement whereby the two boilers, one boiler system for producing hot water for the beverage and one boiler system for producing steam, are provided with water that has been optimised for each water heating system individually through the use of a two filter arrangement. This split filtration system simultaneously improves coffee quality, improves machine reliability and reduces filtration costs.

Coffee quality is improved as the split filtration arrangement allows the use of a carbonate filter or carbon filter for the boiler tank of the water boiler system used to provide the hot water to brew the coffee. Machine reliability is improved because it allows the steam tank, of the steam boiler system to receive water that has additionally had calcium and magnesium ions in the source water replaced by sodium ions.

The beverage dispensing machine can contain components that are formed from metals and alloys thereof, such as brass, nickel plated brass and stainless steel.

The reduced limescale and gypsum build up, reduces the need for running descaling processes in situ, which can lead to corrosion of parts of the machine. This enables the filtration system of the present invention to be particular useful in beverage dispensing machines where the metal components through which the water flows are manufactured from a variety of different metals, instead of being manufactured from a single material such as stainless steel. This allows a variety of materials to be used to form the different metal components of the machine through which the water runs through.

Filtration costs are reduced because only the water entering the system used to generate steam or clean the steam boiler is subjected to the more expensive sodium filtration. In a typical filtration system for a beverage dispensing machine 20% of the water entering the filtration system is diverted to the steam boiler over time, and about 80% of the water entering the filtration system is diverted to the water boiler. On the basis the cost per litre for sodium filters is around 2.5p per litre and hydrogen filters is around 1.5p per litre, the cost per litre of fully sodium filtered water would fall by about 20% to 2p per litre for the split filter arrangement in a no by-pass arrangement (100% at 1.5p per litre plus 20% at 2.5p per litre). This results in a saving of 0.5p per litre as compared to a system using only sodium exchange filters.

EXAMPLE 1

A beverage machine comprising a double boiler arrangement was tested with a single filter arrangement and a split filter arrangement. The single filter arrangement used a standard activated carbon hydrogen exchange filter from Brita at 30% bypass. The split filter arrangement additionally used a sodium cation exchange filter from Brita at 0% bypass. The incoming water had a hardness of 13 KH.

The condition of the steam tanks was inspected after 20 days at 100 Cups of regular 12 fl oz (354 ml) caffe latte per day.

A buildup of lime scale on the induction coil heater and other components of the beverage machine was clearly visible on the beverage machine having a single filter arrangement. An increase of 8 g in mass of the steam tank was measured after the 20 days of use.

No buildup of lime scale on the induction coil heater and other components of the beverage machine was found on the beverage machine having a split filter arrangement. No increase in mass of the steam tank was observed after the 20 days of use.

EXAMPLE 2

Figure 3:
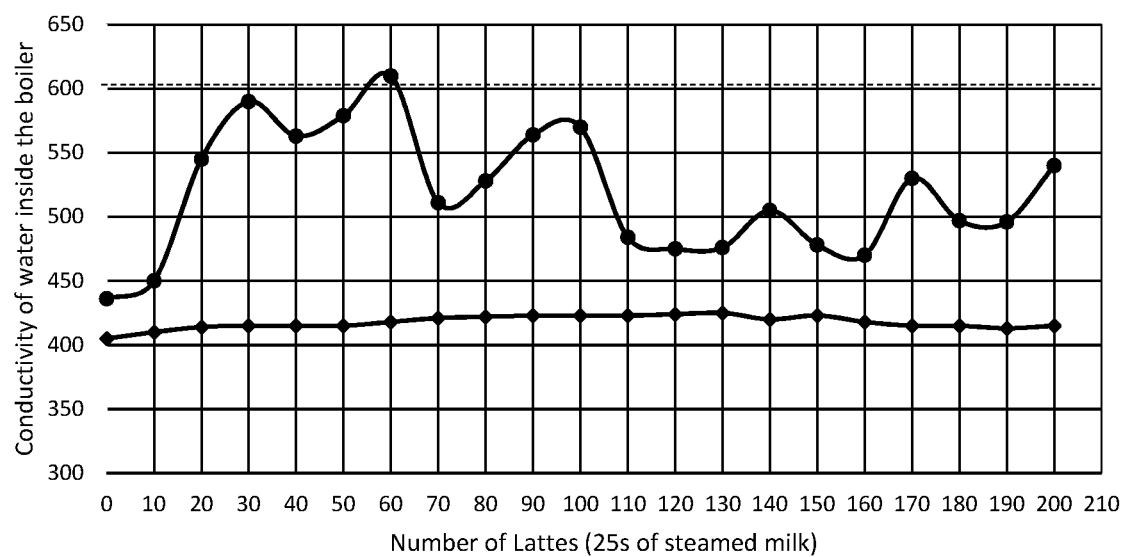
FIG. 3 is graph of the water conductivity in the steam boiler of a beverage machine having a single filter arrangement (●) and a split filter arrangement (♦).

The conductivity of the water in the steam boiler was measured over the number of cups of caffe lattes dispensed by a beverage machine having a single filter arrangement and a split filter arrangement. The results are shown in the graph in FIG. 3.

In the beverage machine having the single filter arrangement conductivity increased as mineral content in the boiler rises due to addition of filtered water into the steam boiler. Conductivity then stabilised as mineral content in the boiler remains in steady state. Additional minerals are removed from solution by the formation of scale.

In the beverage machine using a split filter arrangement, conductivity of the water inside the boiler steam tank, remained steady over the number of cups dispensed.

The invention claimed is:

1. A filtration system for use in a beverage dispensing machine comprising a first and second boiler, the filtration system comprising:
    an input fluid line for connecting the filtration system to a water source;
    at least one first filter connected to the input fluid line;
    an output fluid conduit connected to the at least one first filter and configured to split fluid received from the input fluid line into a first fluid stream that flows through a first fluid output line to the first boiler and a second fluid stream that flows through a second fluid output line to the second boiler; and
    at least one second filter, located in the second fluid output line;
    wherein the at least one second filter is capable of removing, from the second fluid stream, ions not removeable by the at least one first filter.

2. A filtration system as claimed in claim 1 wherein the at least one second filter is capable of removing calcium and magnesium ions.

3. A filtration system as claimed in claim 1 wherein the at least one first filter is capable of removing carbonate ions.

4. A filtration system as claimed in claim 1 wherein the at least one first filter is capable of bringing a hardness of the fluid to around 4 KH.

5. A filtration system as claimed in claim 1 wherein the at least one first filter comprises an activated carbon filter and/or a mild acid anion exchange filter.

6. A filtration system as claimed in claim 1 wherein the at least one first filter comprises an activated carbon plus hydrogen anion exchange filter.

7. A filtration system as claimed in claim 1 wherein the at least one second filter comprises a sodium cation exchange filter.

8. A filtration system as claimed in claim 1 wherein the at least one first filter is a variable bypass filter.

9. A filtration system as claimed in claim 1 wherein at least one of the at least one first filter and the at least one second filter is removeably mounted in the filtration system.

10. A beverage dispensing machine comprising a filtration system as claimed in claim 1.

11. A beverage dispensing machine as claimed in claim 10 comprising a first boiler for heating water to be dispensed and a second boiler to produce steam to be dispensed, a coffee brewer and a dispensing spout, wherein the filtration system is connected to the first boiler via the first fluid output line and the second boiler by the second fluid output line.

12. A beverage dispensing machine as claimed in claim 10 further comprising a coffee grinder and container for holding a milk supply.

13. A filtration system as claimed in claim 1, further comprising a junction coupled to the at least one first filter, the first fluid output line, and the second fluid output line.

14. A filtration system as claimed in claim 1, further comprising a junction coupled to the output fluid conduit.

15. A filtration system as claimed in claim 1, further comprising a valve configured to control fluid flow from the input fluid line into the first fluid output line and the second fluid output line.

16. A filtration system as claimed in claim 15, wherein the valve is coupled to a junction of the output fluid conduit.

* * * * *